United States Patent [19]

Rohn

[11] Patent Number: 5,107,576
[45] Date of Patent: Apr. 28, 1992

[54] PROCESS FOR THE MANUFACTURE OF AUTOMOTIVE SEAT BACKS

[75] Inventor: Wolfgang K. Rohn, Newmarket, Canada

[73] Assignee: Integram, Inc., Newmarket, Canada

[21] Appl. No.: 535,023

[22] Filed: Jun. 8, 1990

Related U.S. Application Data

[63] Continuation-in-part of Ser. No. 194,530, May 12, 1988, abandoned.

[51] Int. Cl.⁵ .............................................. B29C 67/22
[52] U.S. Cl. ...................................... 29/91.1; 29/458; 264/46.4; 264/46.6; 264/46.8
[58] Field of Search ............... 29/458, 91.1, 91.5; 264/46.4, 46.6, 46.8

[56] References Cited

U.S. PATENT DOCUMENTS

| | | |
|---|---|---|
| 3,878,277 | 4/1975 | Velte . |
| 3,971,112 | 7/1976 | Amato et al. ................. 264/46.8 |
| 4,715,916 | 12/1987 | Shimada . |
| 4,860,415 | 8/1989 | Witzke ......................... 264/46.4 |
| 4,908,170 | 3/1990 | Kurimoto ...................... 264/46.6 |

FOREIGN PATENT DOCUMENTS 58-101029 6/1983 Japan .................................. 264/46.8

Primary Examiner—Robert A. Dawson
Assistant Examiner—Allan R. Kuhns
Attorney, Agent, or Firm—Cushman, Darby & Cushman

[57] ABSTRACT

A method of making a seat back which includes the steps of sewing a front panel and a back panel together along sewing seams which are exterior with respect to the interior surfaces of the panels so as to form a bag-like structure in a condition wherein the exterior surfaces of the front and rear panels are generally facing one another, sliding the bag-like structure onto a tongue-like mold while the bag-like structure is in the condition in which the panels thereof were sewn together and without inverting the same in any way so as to bring the exterior surface of the front panel into face-to-face relation with a mold surface of the tongue-like mold, contacting the exterior surface of the front panel with the mold surface of the tongue-like mold, forming a body of foam material on the interior surface of the front panel while the exterior surface thereof is in contact with the mold surface, inverting the bag-like structure with the body of foam material adhered to the front panel thereof, and mounting the inverted bag-like structure over an interior frame.

12 Claims, 3 Drawing Sheets

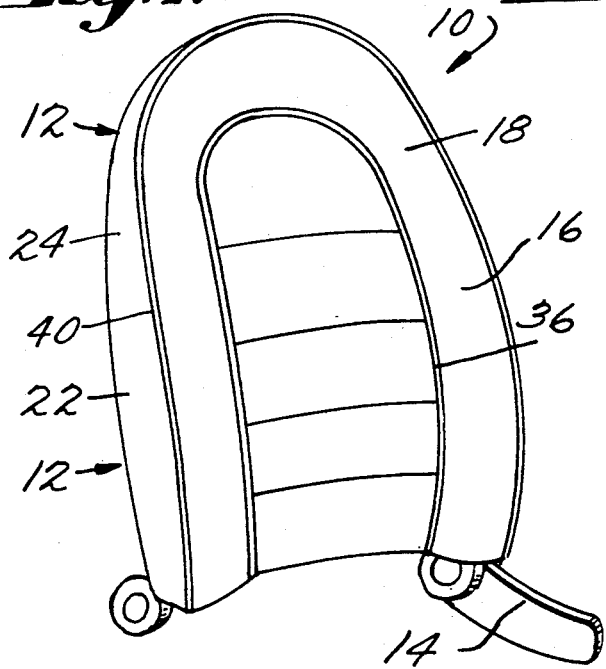
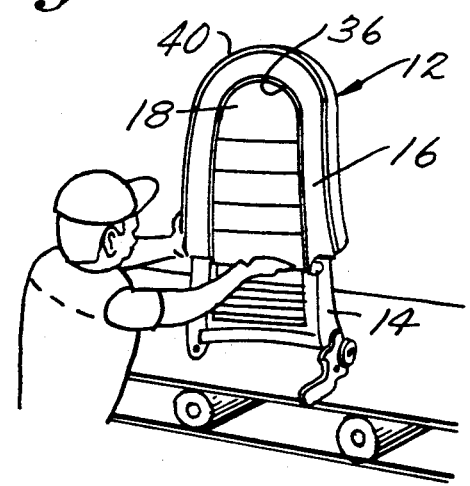
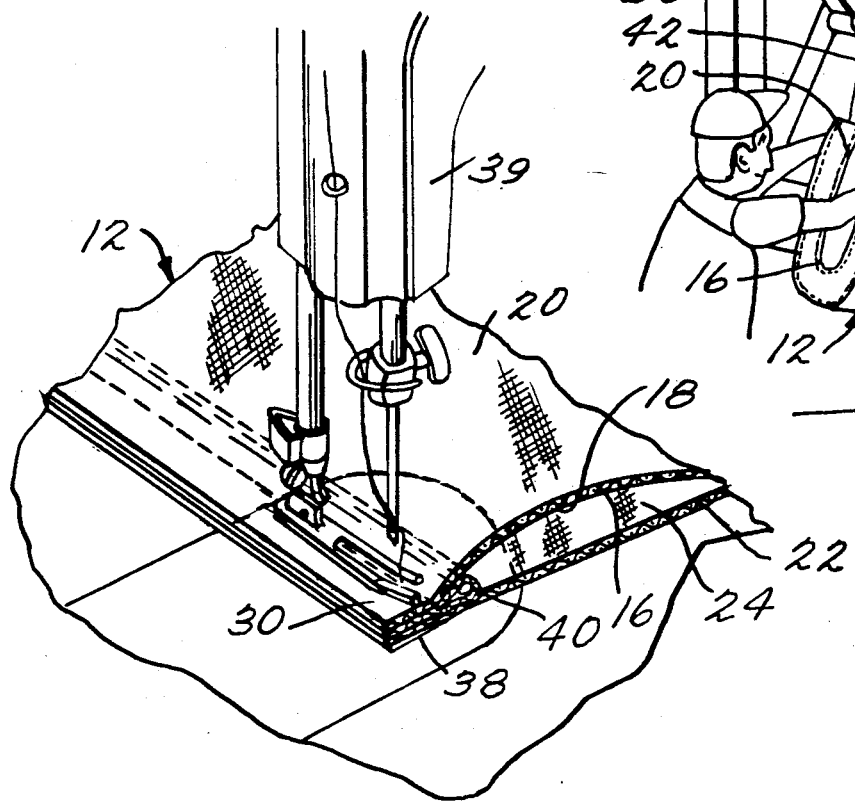
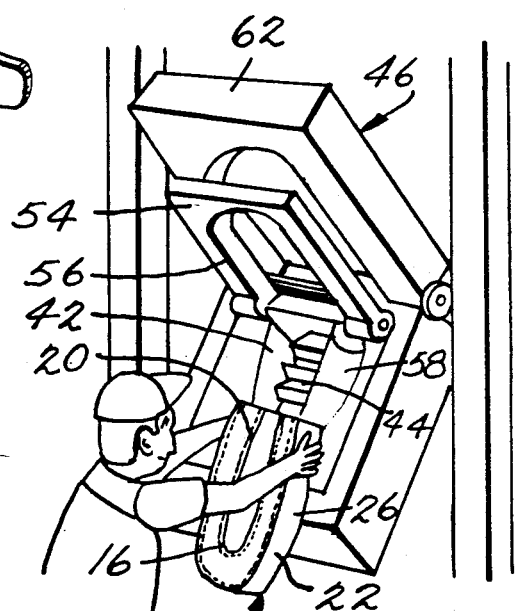

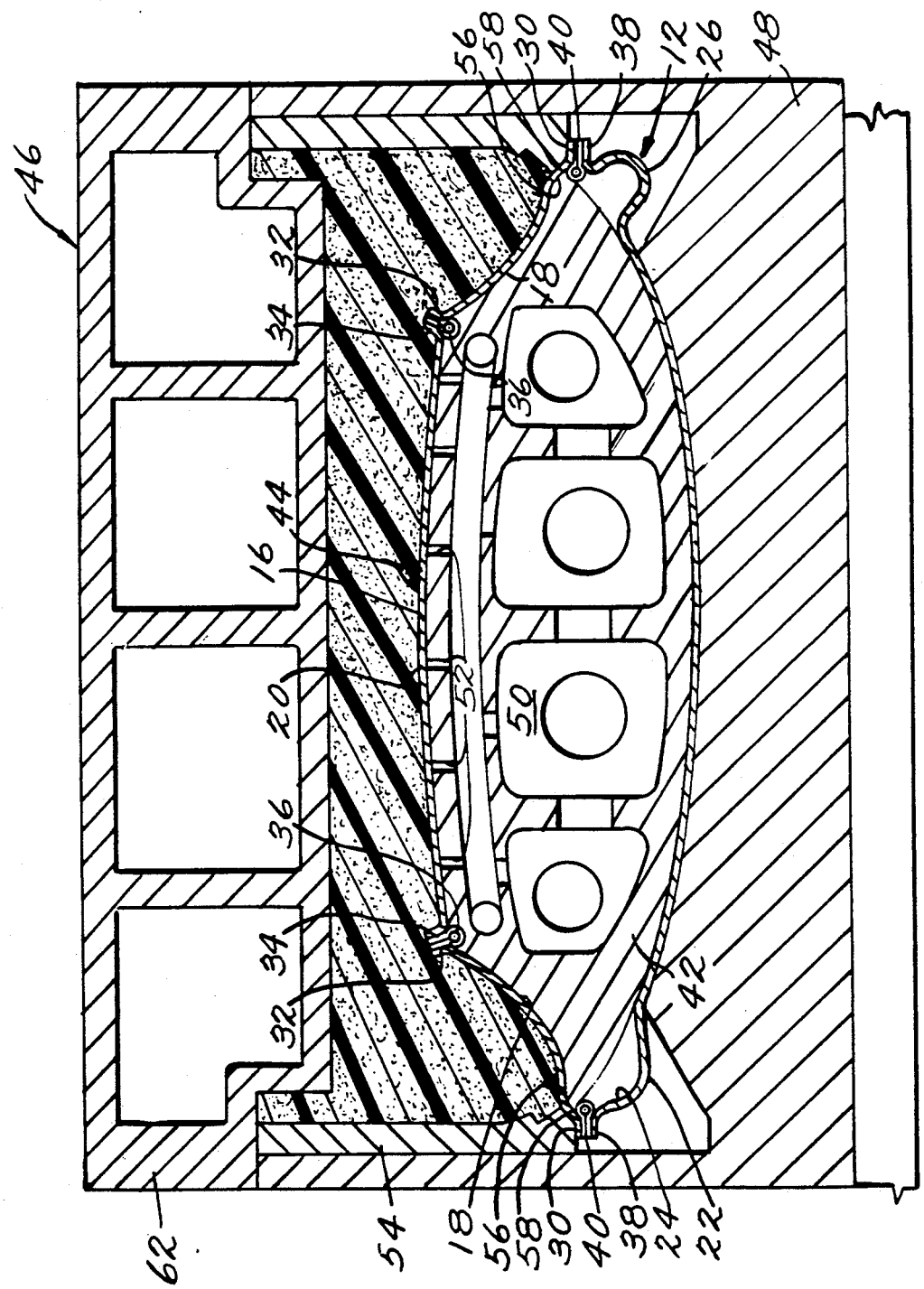

PROCESS FOR THE MANUFACTURE OF AUTOMOTIVE SEAT BACKS

This application constitutes a continuation-in-part of application Ser. No. 07/194,530, filed May 12, 1988, now abandoned, entitled "Process for Manufacture of Molded Material-Covered Product".

This invention relates to automotive seats and the like and, more particularly, to improvements in a method for making automobile seats, more specifically, automobile seat backs.

Automobile seat backs of the type herein contemplated are best exemplified by the front seat back where the entire frame is covered, both front and back. Typically, such a seat back includes an interior frame, an exterior bag-like structure extending over the interior frame having a front panel presenting an exterior surface at the front of the interior frame and an opposite interior surface and a back panel presenting an exterior surface at the back of the interior frame and an opposite interior surface and a body of foam material between the interior surface of the front panel and the interior frame.

An exemplary disclosure of a seat back of the type herein contemplated is contained in U.S. Pat. No. 3,878,277 with reference to FIGS. 5-8. The seat back of these Figures is made by first placing a piece of material which is to provide the front panel onto a vacuum mold with the exterior surface in face-to-face relation with a mold surface of a mold. A vacuum is then drawn through the mold to conform the exterior surface of the front panel with the mold surface which is the shape it will finally assume. Thereafter, a mold frame is placed over the exposed interior surface of the front panel around its perimeter to clamp the perimeter or peripheral edges of the front panel to the mold. Foaming material is then inserted within the frame on the interior surface of the shaped front panel and the foaming material is cured to form a body of foam material integrally united with the interior surface of the front panel. Thereafter, a piece of material, which is to provide the back panel is placed in generally coextensive relation over the exterior surface of the front panel with the exterior surface thereof facing the exterior surface of the front panel. The two generally coextensive panels with their exterior surfaces facing one another are then sewn along abutting peripheral edges that will be the opposite sides and top of the seat back when complete. When this sewing has been completed, the two panels form a bag-like structure having an integral foam body on the exposed interior surface of the front panel. The bag-like structure in this condition appears in inverted relation to the way it will finally appear. Consequently, the next step is to invert the bag-like structure so that the exterior surfaces of the front and back panels which were originally inside facing one another are now on the outside facing in opposite directions. The seat back is completed by mounting the inverted bag-like structure over the back seat interior frame and making whatever securement is appropriate along the bottom.

U.S. Pat. No. 4,715,916 discloses a similar final seat back configuration. The process of making it differs in that the front panel and rear panel are initially sewn together into a bag-like structure and then inverted so as to be telescoped or slid over a tongue-like mold so that the front panel extends over the mold surface with its exterior surface in face-to-face relation with the mold surface and its interior surface exposed. A cooperating mold is then moved into contact with the exposed interior surface of the front panel to mold the front panel between the two molds into its final shape. The cooperating mold is then removed and a body of foam material preformed about the interior frame of the seat and having a face of a shape conforming to the shape of the front panel is then adhered in face-to-face relation with the front panel, as by an adhesive. Thereafter, the back panel is inverted over the top of the foam body and interior frame and suitable securement is made along the bottom to complete the seat back.

Application Ser. No. 07/194,530 discloses a similar seat back construction which is made by a method which includes the steps of initially sewing the front and back panels together into a bag-like structure and then inverting the bag-like structure so as to be telescoped or slid over a tongue-like mold in much the same manner as was done in the initial steps of U.S. Pat. No. 4,715,916. The remaining steps were more in accordance with those of U.S. Pat. No. 3,878,277 than U.S. Pat. No. 4,715,916. That is, instead of molding the front panel between the tongue-like mold and a cooperating mold, a vacuum is used to draw the exterior surface of the front panel into conformity with the tongue-like mold surface. A feature of the disclosed method of the application is that the seams sewn into the bag-like structure were used as stops in conjunction with the tongue-like vacuum mold to insure a properly controlled amount of stretch in the front panel material as it is drawn by vacuum into shaped conformance with the mold surface. Thereafter, foaming material is inserted within a peripheral frame of the mold assembly and cured in integral contact with the interior surface of the front panel. The last two steps are to reinvert the bag-like structure with the foam thereon and mount the reinverted bag-like structure over the back seat frame and secure its bottom.

In practicing the method of the application, it has been found that a quality product can be made without the necessity of inverting the initially formed bag-like structure to slide it on the tongue-like mold and thereafter reinvert it. Instead, applicant has found that the same quality product can be made with only one inversion, thus saving the time and expense of undertaking two inversions. Applicant has found that, by inspecting the material which is used to make the panels of the bag-like structure before any sewing takes place and actually accomplishing the sewing operation in a way to complete the bag-like structure in an inverted relation, inspection of the quality of the bag-like structure can be achieved by inspecting the seams while the bag-like structure is in its inverted relation so that the bag-like structure can be slid or telescoped onto the tongue-like mold without the bag-like structure ever undergoing an inversion step.

Accordingly, it is an object of the present invention to provide a method which embodies the principles and advantages enunciated above capable of making a seat back which includes an interior frame, an exterior bag-like structure extending over the interior frame having a front panel presenting an exterior surface at the front of the interior frame and an opposite interior surface and a back panel presenting an exterior surface at the back of the frame and an opposite interior surface, and a body of foam material between the interior surface of the front panel and the interior frame. This objective is realized by providing a method which comprises the steps of sewing the front panel and the back panel together along sewing seams which are exterior with respect to the interior surfaces of the panels so as to form the bag-like structure in a condition wherein the exterior surfaces of the front and rear panels are generally facing one another, sliding the bag-like structure onto a tongue-like mold while the bag-like structure is in the condition in which the panels thereof were sewn together and without inverting the same in any way so as to bring the exterior surface of the front panel into face-to-face relation with a mold surface of the tongue-like mold, contacting the exterior surface of the front panel with the mold surface of the tongue-like mold to shape the exterior surface of the front panel into conformity with the mold surface of the tongue-like mold, forming the body of foam material on the interior surface of the front panel while the exterior surface thereof is in contact with the mold surface of the tongue-like mold so as to cause the body of foam material to integrally adhere to the front panel, inverting the bag-like structure with the body of foam material adhered to the front panel thereof so that the exterior surfaces of the panels are disposed exteriorly thereof and face generally in opposite directions and the interior surfaces of the panels and the body of foam material are disposed interiorly thereof, and mounting the inverted bag-like structure over the interior frame.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is a perspective view of an automotive seat back made by the method of the present invention;

FIGS. 2-6 and 8-10 are pictorial views illustrating the successive steps of the present method; and FIG. 7 is a sectional view taken along the line 7-7 of FIG. 6.

Figure 4:
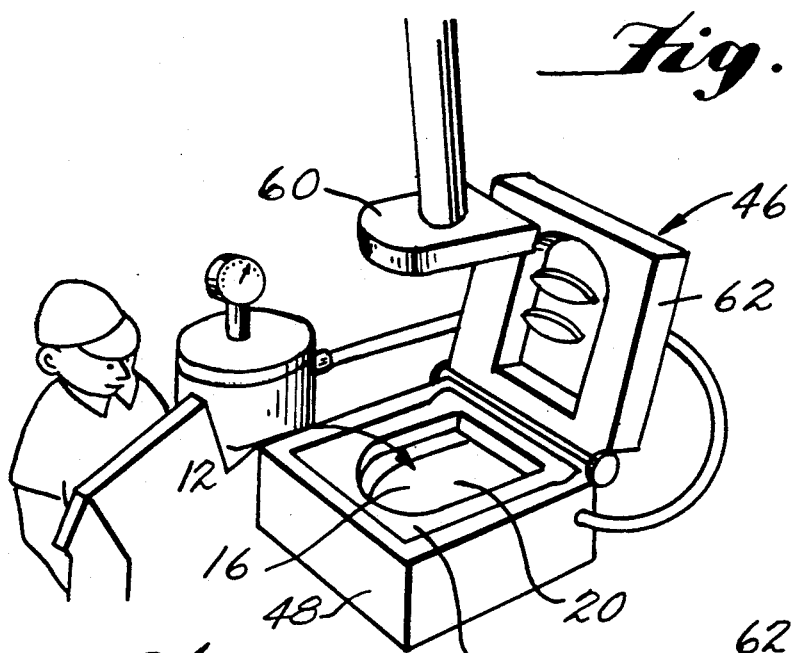

Referring now more particularly to the drawings, there is shown in FIG. 1 a seat back, generally indicated at 10. which is made in accordance with the principles of the present invention. As shown, the seat back 10 includes an exterior bag-like structure, generally indicated at 12, which extends over an interior frame 14 suitably secured to the frame of the seat bottom (not shown) in accordance with conventional practice.

The bag-like structure 12 includes a front panel 16 presenting an exterior surface 18 at the front of the interior frame 14 and an opposite interior surface 20 and a back panel 22 presenting an exterior surface 24 at the back of the interior frame 14 and an opposite interior surface 26. A body of foam material 28 is fixed to the interior surface 20 of the front panel in a position forwardly of the interior frame 14.

FIG. 2 illustrates a procedure undertaken in an initial step of the method of the present invention for making the seat back 10. In the embodiment shown, the bag-like structure 12 consists essentially of the front panel 16 and back panel 22. As shown, the front panel 16 is of two-piece construction including an inverted U-shaped outer piece of material (e.g., vinyl) providing an outer inverted U-shaped marginal edge 30 and an inner inverted U-shaped marginal edge 32. As can be seen from FIG. 7, the inner marginal edge 32 is sewn to a marginal edge 34 of a central piece of material (e.g., vinyl) forming the second piece of the two-piece front panel 16. It will be understood that the front panel may be formed of one piece or more than two pieces of any suitable material. the two-piece construction being merely exemplary. An exemplary material is vinyl.

While the marginal edges 30 and 32 may be secured together in any known fashion. the sewn seam is preferred since this mode of connection is utilized between the front panel 16 and the back panel 18. The sewn seam between the edges 32 and 34 is made so that the stitches are exterior of the interior surface 20 of each front panel piece. In the embodiment shown, a welting strip 36 is sewn between the marginal edges 30 and 32 so that the welting is exposed on the exterior surface 18 of the front panel 16.

FIG. 2 specifically illustrates the sewing of the outer inverted U-shaped marginal edge 30 of the front panel 16 to an outer inverted U-shaped marginal edge 38 of the back panel 22. In accordance with the principles of the present invention, the seam between the marginal edges 30 and 38 of the two panels is made on a conventional sewing machine 39 so that the exterior of the stitches are on the interior surfaces 20 and 26 of the two panels 16 and 22. Preferably, a welting strip 40 is sewn between the marginal edges 30 and 38 so that the welting shows exteriorly along with the exterior surfaces 18 and 24 of the panels 16 and 22.

It will be noted that the bag-like structure 12 is completed by completing the sewing seam between the marginal edges 30 and 38 and welting strip 40 so that the resultant bag-like structure is completed in a condition wherein the exterior surfaces 18 and 24 of the front and back panels 16 and 22 are disposed in facing relation with respect to one another and the interior surfaces 20 and 26 of the front and back panels face away from one another.

In accordance with the principles of the present invention, it has been found that it is not necessary for any reason to alter the condition of the bag-like structure 12 before proceeding with the next step in the manufacture of the seat back 10. Inspection of the bag-like structure 12 itself for defects can be accomplished without gaining exterior access to the exterior surfaces 18 and 24 so long as the material used to make the individual panels 16 and 22 is inspected prior to the making of the final seam or inspection of the exterior surfaces of the panels themselves is undertaken prior to the final seam. Stated differently, inspection for flaws in the material used to make the bag-like structure 14 should be undertaken before the bag-like structure is completely formed. Flaws in the seams can be detected by inspection of the exterior of the stitches which are visible from the exposed interior surfaces 20 and 26. It will be understood that the back panel 22 in the embodiment shown is large enough to present not only the back of the seat back but the sides as well. It is within the contemplation of the present invention to provide a separate panel or panels between the front and back panels which present the sides and top of the seat back when finally made. Such side and/or top panels are preferably seamed in the same manner previously described. Stated differently, it is not necessary that the front and back panels be interconnected by a common seam in the manner of the exemplary embodiment described above, they may be interconnected by intervening panels having sewn seams with both panels. The final such seam is, in accordance with the principles of the present invention, provided by stitching which is exterior with respect to the interior surfaces involved.

FIG. 3 pictorially represents the next step in the method of the present invention which is the step of sliding the bag-like structure 12 onto a tongue-like mold 42 while the bag-like structure 12 is in the condition in which the panels 16 and 22 thereof were sewn together and without inverting the same in any way so as to bring the exterior surface 18 of the front panel 16 into face-to-face relation with a mold surface 44 of the tongue-like mold 42.

As shown, the tongue-like mold 42 forms one part of a mold assembly, generally indicated at 46, which includes a base 48 on which the tongue-like mold 42 is pivotally mounted for movement between a bag-engaging and removing position, as shown in FIG. 3, and an operative position, as shown in FIGS. 4-7. The mold surface 44 has a configuration which conforms with the exterior configuration of the seat 10 when completed. The tongue-like mold 42 also includes a vacuum system 50 which extends to the mold surface through a series of openings 52. The mold assembly 46 also includes a peripheral foaming mold 54 which is pivoted to the base 48 so as to be moved between an inoperative position, such as shown in FIG. 3, which permits the bag-like structure 12 to be inserted on the tongue-like mold 42, and an operative position, such as shown in FIGS. 4-7, wherein a peripheral edge 56 of the peripheral foaming mold 54 cooperates with a peripheral edge 58 of the tongue-like mold 42 to control the movement of the peripheral portion of the front panel 16 therebetween, which movement is stopped by the engagement of the welting strip 40 of the front panel - back panel seam with the peripheral edges 56 and 58.

FIG. 4 illustrates the next step in the present process which is to facilitate the engagement of the front panel 16 with the mold surface 44, if necessary, by lowering a pad or plug assembly 60 through the peripheral mold 54 into the upwardly exposed interior surface 20 of the front panel 16 to move appropriate sections of the front panel 16 into positions of engagement with appropriate sections of the mold surface 44. When the pad assembly has reached its operative position, the vacuum system 50 is energized to fully engage the entire exterior surface 18 of the front panel 16 with the mold surface 44, which in accordance with the principles enunciated in U.S. application Ser. No. 07/194,530, may result in the stretching of sections of the front panel depending upon the stopping action provided by the welting strip 40 seam. Once the front panel 16 is in engagement with the mold surface 44, the configuration of the exterior surface 18 of the front panel 16 is in conformity with the shape it will finally assume, but the vacuum does not set the configuration. The setting is accomplished in future steps.

The use of the pad assembly 60 is style dependent. Where the concavity of the mold surface 44 does not include central flats, vacuum alone is sufficient to effect conformity. Where flats are presented, the pad assembly 60 is utilized. Where plural flats are provided, the pad assembly includes plural pads which may be sequentially engaged.

Figure 5:
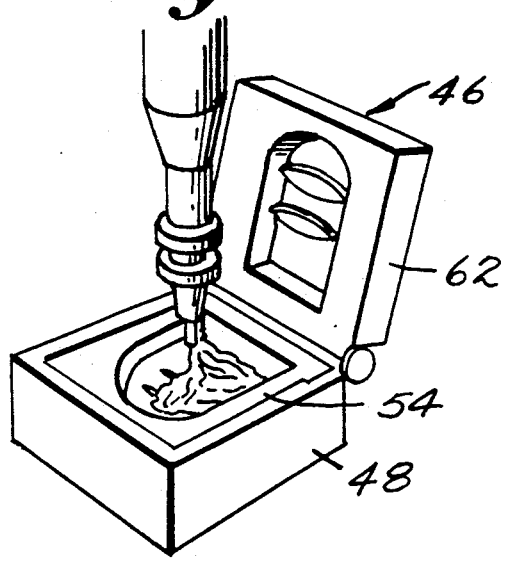

FIG. 5 illustrates the next step in the process which is to feed into the open peripheral foaming mold 54 and onto the interior surface 20 of the front panel 16 an amount of heat foamable and curable material which will fill the peripheral frame when closed by a closing mold 62 forming a final part of the mold assembly 46.

Figure 6:
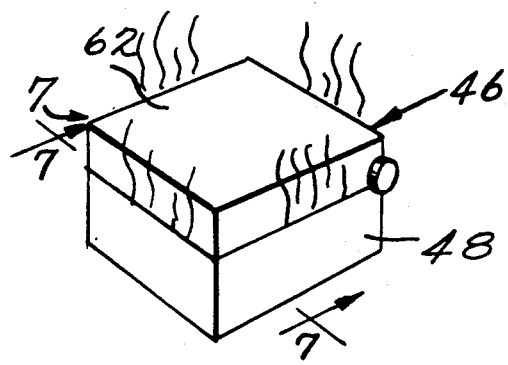

As shown, the closing mold 62 is pivoted to the base 48 between an open position, such as shown in FIGS. 3-5 permitting the foam material to be added, and a closed position, such as shown in FIGS. 6 and 7 wherein the cooperating peripheral foaming mold 54 is further compressed into engagement with the interior surface 20 of the front panel.

FIG. 6 illustrates the next step in the process which is to cure the foamable material so that it foams and fills the space defined by the upwardly facing interior surface 20 of the front panel 16, the interior peripheral surface of the peripheral mold 54, and the downwardly facing surface of the closure mold 62.

Figure 8:
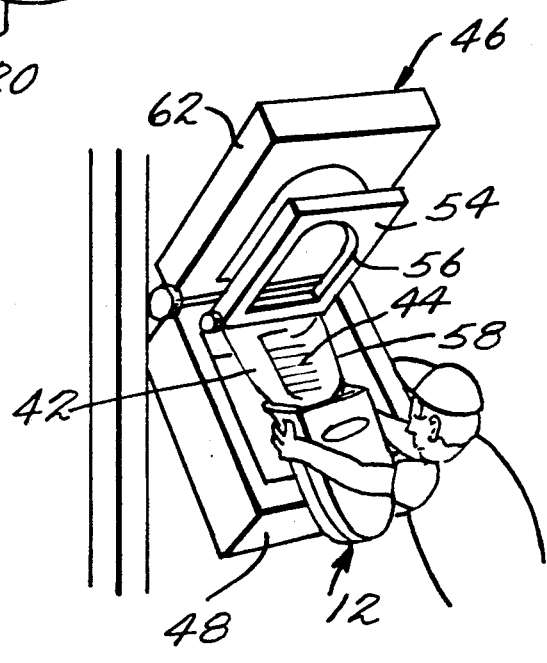

FIG. 8 illustrates the next step in the process which is to move the closure mold 62 from its operative position into its inoperative position and then the peripheral mold 54 from its operative position into its inoperative position and finally the tongue-like mold 42 into its bag receiving and removing position. Next, the operator removes the bag-like structure 12 with the body of foam material 28 integrally attached to the interior surface 20 of the front panel 16 thereof.

Figure 9:
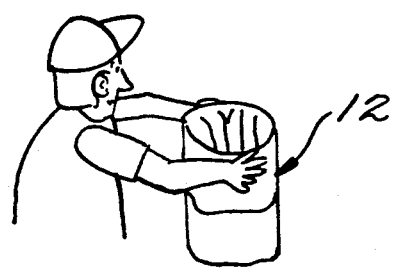

FIG. 9 illustrates the next step in the process which is to invert the bag-like structure 12 with the integral body of foam material 28 thereof so that the exterior surfaces 18 and 24 of the panels 16 and 22 are disposed exteriorly thereof and face generally in opposite directions and the interior surfaces 20 and 26 of the panels 16 and 22 and the body of foam material 28 are disposed interiorly thereof. FIG. 9 illustrates one mode of accomplishing this inversion, namely by feeding the bag-like structure 12 over a suction pipe 64 and allowing the suction in the pipe to accomplish the inversion.

FIG. 10 illustrates a final step in the present process wherein the inverted bag-like structure 12 with the body of foam material 28 adhered to the interior surface 20 of the front panel 16 is mounted over the frame 14 of the seat back 10. The lower edges are suitably affixed under the bottom of the frame 14 to complete the assembly of the seat back 10.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making a seat back which includes an interior frame, an exterior bag-like structure extending over the interior frame having a front panel presenting an exterior surface at the front of the interior frame and an opposite interior surface and a back panel presenting an exterior surface at the back of the frame and an opposite interior surface, and a body of foam material between the interior surface of the front panel and the interior frame, said method comprising the steps of sewing said front panel and said back panel together along sewing seams which are exterior with respect to the interior surfaces of said panels so as to form said bag-like structure in a condition wherein the exterior surfaces of said front and back panels are generally facing one another, sliding the bag-like structure onto a tongue-like mold while said bag-like structure is in the condition in which the panels thereof were sewn together and without inverting the same in any way so as to bring the exterior surface of the front panel into face-to-face relation with a mold surface of the tongue-like mold.

contacting the exterior surface of the front panel with the mold surface of the tongue-like mold to shape the exterior surface of the front panel into conformity with the mold surface of the tongue-like mold, forming the body of foam material by foaming a foamable material on the interior surface of the front panel while the exterior surface thereof is in contact with the mold surface of the tongue-like mold so as to cause said body of foam material to integrally adhere to said front panel, inverting said bag-like structure with the body of foam material adhered to the front panel thereof so that the exterior surfaces of said panels are disposed exteriorly thereof and face generally in opposite directions and the interior surfaces of said panels and said body of foam material are disposed interiorly thereof, and mounting the inverted bag-like structure over the interior frame.

2. A method as defined in claim 1 wherein inspection of the panel material for defects is accomplished prior to the sewing step.

3. A method as defined in claim 2 wherein inspection of the bag-like structure for structural defects is accomplished by inspecting the sewn seams after the sewing step without inverting the bag-like structure.

4. A method as defined in claim 3 wherein in contacting the exterior surface of the front panel with the mold surface of the tongue-like mold a peripheral edge of a peripheral foaming mold is initially placed in contact with the interior surface of the front panel adjacent of the sewn seam thereof so that during the contacting step the sewn seam is retained exteriorly of the peripheral edge so as to limit the amount of peripherally inward movement of the front panel.

5. A method as defined in claim 4 wherein a source of vacuum is applied through the mold surface to completely contact the remaining exterior surface of the front panel with the mold surface of the tongue-like mold, the limiting action of the engagement of the sewn seam with the peripheral edge of the peripheral foaming mold enabling localized stretching to take place where necessary.

6. A method as defined in claim 5 wherein a plug assembly is moved into contact with one or more sections of the remaining interior surface of the front panel to engage the exterior surface thereof into contact with one or more corresponding sections of the mold surface of the tongue-like mold.

7. A method as defined in claim 6 wherein the body of foam material is formed by first supplying a predetermined quantity of foamable and curable material onto the interior surface of the front panel with the exterior surface thereof contacting the mold surface of the tongue-like mold which is confined by said peripheral foaming mold and thereafter closing the peripheral foaming mold and foaming and curing the foamable material within the closed peripheral foaming mold in contact with the interior surface of the front panel inwardly of the peripheral edge thereof, the curing of the body of foam material in contact with the interior surface of the front panel while the exterior surface thereof is shaped in conformity with the mold surface enabling said foam material to permit operative deformation of the exterior surface of the front panel in use and return to shaped conformity when the operative deformation is removed.

8. A method as defined in claim 1 wherein in contacting the exterior surface of the front panel with the mold surface of the tongue-like mold a peripheral edge of a peripheral foaming mold is initially placed in contact with the interior surface of the front panel adjacent of the sewn seam thereof so that during the contacting step the sewn seam is retained exteriorly of the peripheral edge so as to limit the amount of peripherally inward movement of the front panel.

9. A method as defined in claim 8 wherein a source of vacuum is applied through the mold surface to completely contact the remaining exterior surface of the front panel with the mold surface of the tongue-like mold, the limiting action of the engagement of the sewn seam with the peripheral edge of the peripheral foaming mold enabling localized stretching to take place where necessary.

10. A method as defined in claim 9 wherein a plug assembly is moved into contact with one or more sections of the remaining interior surface of the front panel to engage the exterior surface thereof into contact with one or more corresponding sections of the mold surface of the tongue-like mold.

11. A method as defined in claim 10 wherein the body of foam material is formed by first supplying a predetermined quantity of foamable and curable material onto the interior surface of the front panel with the exterior surface thereof contacting the mold surface of the tongue-like mold which is confined by said peripheral foaming mold and thereafter closing the peripheral foaming mold and foaming and curing the foamable material within the closed peripheral foaming mold in contact with the interior surface of the front panel inwardly of the peripheral edge thereof, the curing of the body of foam material in contact with the interior surface of the front panel while the exterior surface thereof is shaped in conformity with the mold surface enabling said foam material to permit operative deformation of the exterior surface of the front panel in use and return to shaped conformity when the operative deformation is removed.

12. A method as defined in claim 1 wherein the body of foam material is formed by first supplying a predetermined quantity of foamable and curable material onto the interior surface of the front panel with the exterior surface thereof contacting the mold surface of the tongue-like mold which is confined by a peripheral foaming mold and thereafter closing the peripheral foaming mold and foaming and curing the foamable material within the closed peripheral foaming mold in contact with the interior surface of the front panel inwardly of the peripheral edge thereof, the curing of the body of foam material in contact with the interior surface of the front panel while the exterior surface thereof is shaped in conformity with the mold surface enabling said foam material to permit operative deformation of the exterior surface of the front panel in use and return to shaped conformity when the operative deformation is removed.

* * * * *